US012593168B2

(12) United States Patent
Thiagarajan et al.

(10) Patent No.: US 12,593,168 B2
(45) Date of Patent: Mar. 31, 2026

(54) LOW-POWER PROGRAMMABLE ANALOG SUBSYSTEM FOR ACOUSTIC ACTIVITY DETECTION

(71) Applicant: Cypress Semiconductor Corporation, San Jose, CA (US)

(72) Inventors: Eashwar Thiagarajan, Bothell, WA (US); Rodolfo Gondim Lossio, Taiwan (TW); Ding Ma, Kirkland, WA (US); Nidhin Mulangattil Sudhakaran, Lynnwood, WA (US); Andrew Page, Kirkland, WA (US); Ashutosh Pandey, Irvine, CA (US); Bert Sullam, Bellevue, WA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 189 days.

(21) Appl. No.: 18/329,428

(22) Filed: Jun. 5, 2023

(65) Prior Publication Data

US 2024/0406619 A1 Dec. 5, 2024

(51) Int. Cl.

*H04R 3/00* (2006.01)
*H04R 1/40* (2006.01)
*H04R 3/04* (2006.01)

(52) U.S. Cl.

CPC ............... *H04R 1/406* (2013.01); *H04R 3/04* (2013.01); *H04R 2430/01* (2013.01)

(58) Field of Classification Search

CPC ... H04R 1/08; H04R 3/00; H04R 3/06; H04R 19/005; H04R 29/00; H04R 19/016
USPC ........................................................ 381/56, 92
See application file for complete search history.

(56) References Cited

U.S. PATENT DOCUMENTS

| | | | | |
|---|---|---|---|---|
| 8,942,391 | B2 * | 1/2015 | Furge | H03G 11/008 381/104 |
| 9,445,173 | B2 * | 9/2016 | Wiesbauer | G06F 3/165 |
| 9,491,541 | B2 * | 11/2016 | Breitschaedel | H04R 3/002 |
| 12,182,674 | B2 * | 12/2024 | Huang | G06F 3/16 |

* cited by examiner

*Primary Examiner* — Disler Paul

(57) ABSTRACT

A method includes receiving a first signal, wherein the first signal is an audio signal. The method further includes providing the first signal to a first comparison circuit. The method further includes providing the first signal to a second comparison circuit. The method further includes receiving, from the first comparison circuit, a first comparison signal. The method further includes receiving, from the second comparison circuit, a second comparison signal. The method further includes providing a wake-up signal to a processing device based on the first comparison signal and the second comparison signal.

15 Claims, 4 Drawing Sheets

LOW-POWER PROGRAMMABLE ANALOG SUBSYSTEM FOR ACOUSTIC ACTIVITY DETECTION

TECHNICAL FIELD

The disclosure pertains to acoustic activity detection; more specifically, to a low-power programmable analog subsystem that can be adapted to acoustic activity detection in different acoustic environments.

BACKGROUND

Acoustic activity detection is a target functionality in many applications. For example, a device may be configured to determine whether a wake word is spoken in the vicinity of the device, the device may be configured to listen for a certain trigger sound, or the like. Acoustic activity detection may be performed conventionally by components that use a significant amount of power, such as processing units.

DETAILED DESCRIPTION

Figure 1:
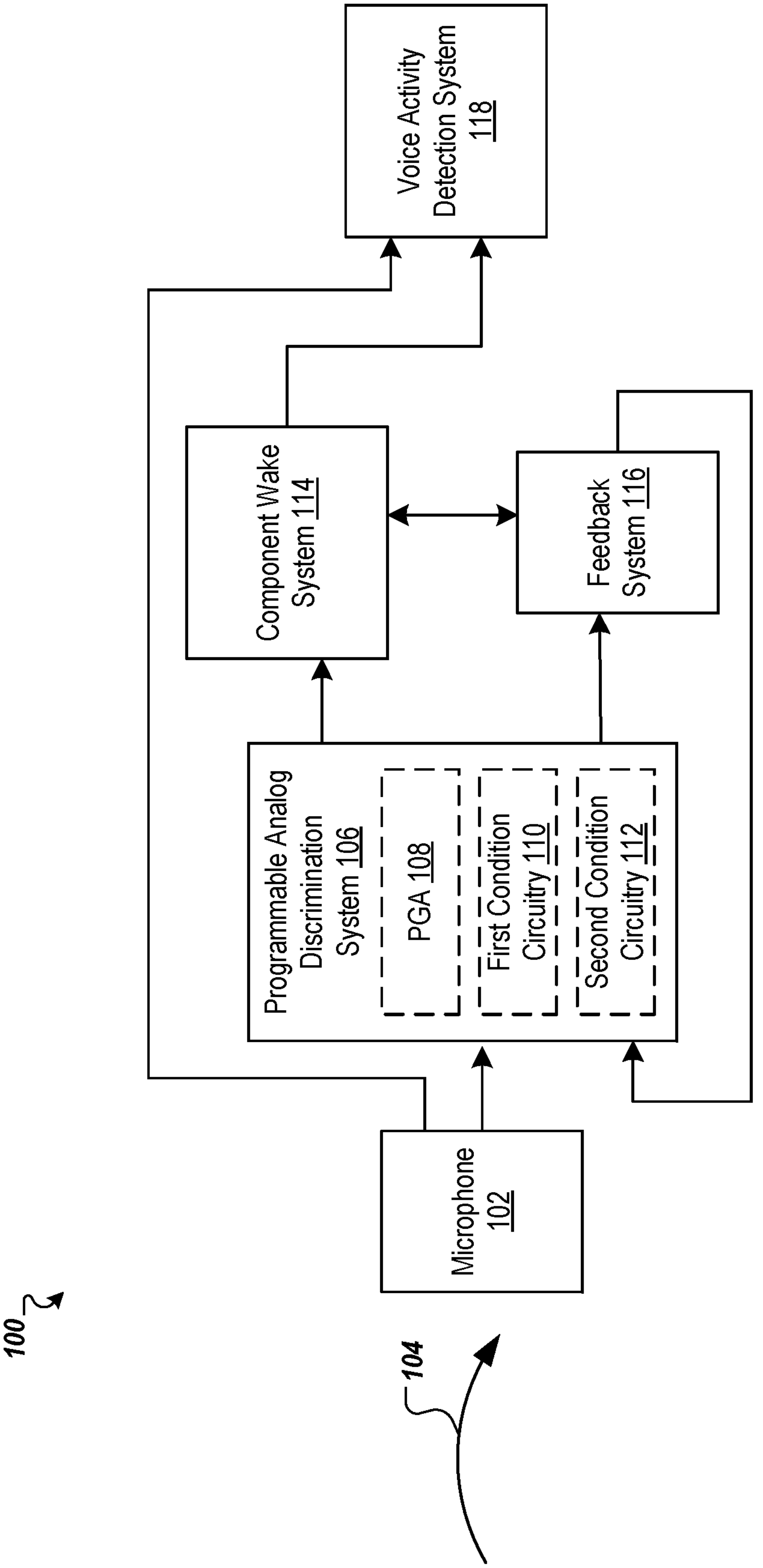
FIG. 1 is a block diagram of an example implementation of some components of a device that utilizes a low-power programmable analog subsystem for acoustic activity detection, according to some embodiments.

Aspects of the present disclosure are directed toward improved operation of acoustic activity detection. In particular, aspects of the present disclosure are directed toward a low-power programmable analog subsystem for acoustic activity detection. Acoustic activity detection may be performed constantly with low device power consumption, which may be a targeted property for some uses, such as battery-operated devices, small profile devices, wearable devices, etc.

A device may be configured to perform some action responsive to receiving an audio trigger. For example, a smart device may respond to a wake word, a safety alarm may respond to the sound of breaking glass, etc. In some conventional systems, audio received by a device (e.g., a digital microphone) may be processed by a processor such as a central processing unit (CPU). A determination may be made by the processor as to whether the audio received by the device contains some trigger, such as a wake word. If the audio signal contains the trigger, further processing of additional audio may be performed.

In such systems, the processor analyzes incoming audio. Processors such as CPUs may consume a fairly high amount of power for operation. In some cases, CPUs may consume several milliamps of current for operation. For some uses, power consumption at this level may hinder other operations of a device, such as reducing battery life, increased heat generation, increased weight or size of the device to account for these drawbacks, increased expense of the device to account for these drawbacks, etc.

In some conventional systems, a low-power system may monitor an audio signal for acoustic activity and send a signal to wake up a processor, such as a CPU, when potentially relevant audio is detected. The low-power monitoring system may determine whether any detected sound meets a threshold condition to initiate waking the processor. The low-power monitoring system may determine whether a frequency of the sound falls within a determined range, for example. Some analysis and decision-making may be made by the low-power system without devoting energy resources to the processor.

In such systems, the low-power system may be inflexible. The low-power system may be appropriately configured for some environments, but not others. A preset condition may be met to initiate waking the processor. In some environments, many acoustic signals (e.g., sounds) may satisfy the threshold condition for waking the processor, but are not related to the function the device is configured to perform. Energy may be expended waking the processor to analyze these errant acoustic signals.

Aspects of the present disclosure may address one or more of these deficiencies of conventional systems. Aspects of the present disclosure enable a low-power programmable analog subsystem for acoustic activity detection. In some embodiments, an analog system receives audio signals. The audio signals may be generated by a microphone, responsive to receiving an acoustic signal. Audio signals may be provided to an analog circuit configured to determine whether the audio signal meets one or more threshold conditions. The analog circuit may act as a signal discrimination circuit to determine if further action is to be performed based on the signal. The analog circuit may be further configured to provide a wake-up signal to a processor. The analog circuit may be programmable. Various thresholds, comparator values, voltages, etc., may be adjustable to customize the performance of the analog circuit. The analog circuit may further include a feedback circuit. The feedback circuit may be configured to make adjustments to the analog programmable circuit. The feedback circuit may be configured to make adjustments to the analog programmable circuit without input from the processor. Operation of the feedback circuit may be performed at low power Operation of the feedback circuit may be performed at a power of hundreds of μA. Operation of the feedback circuit may be performed at a power of about 100 μA. Operation of the feedback circuit may be performed at a power of less than 100 μA. Operation of the feedback circuit may be performed, for example, at 90-100 μA, 80-90 μA, 70-80 μA, etc.

Aspects of the present disclosure provide technical advantages over conventional solutions. The use of a low-power programmable analog subsystem for acoustic activity detection may decrease the power consumption of a system. With decreased power demands, the system may be less expensive to manufacture and operate. The system may have more favorable weight and size constraints to achieve similar performance, battery life, or the like, compared to a conventional system.

The use of a low-power programmable analog subsystem may enable customization of the system to an environment. One or more parameters of the low-power programmable analog subsystem may be adjusted to increase sensitivity, decrease response to false signals, etc. Adjustments may be made in preparation for an intended use environment, responsive to signals received in the environment, adjusted as the environment proximate to the device changes, etc.

The use of a low-power analog feedback circuit may enable low-power adjustment of the signal discrimination circuit. Adjustments may be made to one or more parameters governing operation of the low-power programmable analog subsystem without expending power to operate a processor, converting the signal to the digital domain, operating an analog-to-digital converter, storing values in digital memory, etc. By utilizing an analog feedback circuit, the system may have the technical advantage of avoiding the expenditure of power for adjustment to signal discrimination operations.

In some aspects of the present disclosure, a method includes receiving a first signal, wherein the first signal is an audio signal. The method further includes providing the first signal to a first comparison circuit. The method further includes providing the first signal to a second comparison circuit. The method further includes receiving, from the first comparison circuit, a first comparison signal. The method further includes receiving, from the second comparison circuit, a second comparison signal. The method further includes providing a wake-up signal to a processing device based on the first comparison signal and the second comparison signal.

In some aspects of the present disclosure, a method includes receiving a first signal, wherein the first signal is an audio signal. The method further includes providing a first voltage to a first comparator. The method further includes providing the first signal to the first comparator. The method further includes receiving a first comparison signal based on an output of the first comparator. The method further includes adjusting the first voltage to a second voltage in view of the first comparison signal.

In some aspects of the present disclosure, a circuit includes first comparison circuitry. The first comparison circuitry includes a first comparator. The first comparator receives a first adjustable comparison voltage. The first comparison circuitry further includes a first counter. The first comparison circuitry further includes a second comparator. The second comparator receives a first adjustable comparison value. The first comparison circuitry is provided with a first signal. The first signal is indicative of an audio signal.

FIG. 1 illustrates a block diagram of one example implementation of some components of a device 100 that utilizes a low-power programmable analog subsystem for acoustic activity detection, according to some embodiments. Device 100 may include additional components that are not shown, such as input devices, output devices, signal generation devices, network connectivity devices, additional memory and/or processors, etc. Device 100 may be any device that receives an acoustic signal and performs operations responsive to the acoustic signal. Device 100 may be an Internet of Things (IoT) device. Device 100 may be a wearable device, e.g., a smartwatch. Device 100 may be a mobile phone. Device 100 may be any device configured to monitor an environment for a particular sound, speech, acoustic pattern, or the like.

Device 100 includes a microphone 102. Microphone 102 may be an analog microphone. Microphone 102 may generate analog audio signals responsive to receiving acoustic signals. Microphone 102 may receive acoustic signal 104. Acoustic signal 104 may include any sound source within range of microphone 102. Acoustic signal 104 may include a trigger, e.g., a sound upon which device 100 is configured to perform an action. The trigger may include a wake word, and device 100 may be configured to perform wake word detection. Device 100 may be configured to perform speech analysis, wake word detection analysis, or the like. The trigger may include another sound, such as a sound indicating unsafe conditions, malfunctioning equipment, or the like. Acoustic signal 104 may not include a trigger. Device 100 may be configured to discriminate between acoustic signals that include a trigger (or one or multiple triggers) and acoustic signals that do not include the trigger.

Microphone 102 may provide an analog audio signal to programmable analog discrimination system 106. Programmable analog discrimination system 106 may be used to determine if one or more characteristics of interest are satisfied by an incoming signal. Programmable analog discrimination system 106 may be configured to discriminate between audio signals indicative of acoustic signals containing one or more triggers, and audio signals indicative of acoustic signals that do not contain one or more triggers. For example, programmable analog discrimination system 106 may determine whether one or more characteristics of an incoming signal satisfy conditions indicative of one or more triggers. Programmable analog discrimination system 106 may determine whether an incoming signal has characteristics of speech, such as the expected frequency or volume of a signal associated with speech. Programmable analog discrimination system 106 may be a low-power analog subsystem. Programmable analog discrimination system 106 may have one or more adjustable parameters. Programmable analog discrimination system 106 may include multiple subsystems, such as programmable gain amplifier 108, first condition circuitry 110, second condition circuitry 112, etc. Programmable gain amplifier 108 may receive an audio signal from microphone 102 and amplify the signal for use by other components of device 100. Programmable gain amplifier 108 may include one or more adjustable parameters, such as gain.

Programmable analog discrimination system 106 may include one or more sets of condition circuitry. Condition circuitry may be a collection of components to determine whether an incoming signal meets one or more criteria. Programmable analog discrimination system 106 may have two sets of condition circuitry. Programmable analog discrimination system 106 may include first condition circuitry 110 and second condition circuitry 112. Programmable analog discrimination system 106 may include more or fewer sets of condition circuitry. Programmable analog discrimination system 106 may be configured to utilize one target condition, two target conditions, or more target conditions in determining subsequent operations. Programmable analog discrimination system 106 may utilize a number of conditions in determining whether to wake a processor, digitize the audio signal, store the audio signal, or other operations of device 100. Programmable analog discrimination system 106 may include circuitry to determine whether a frequency of the audio signal is within a target range. Programmable analog discrimination system 106 may include circuitry to determine whether the volume of an audio signal is within a target range. Programmable analog discrimination system 106 may include multiple adjustable parameters, such as which of the sets of condition circuitry to utilize, threshold conditions, whether meeting a condition includes exceeding a threshold or failing to reach the threshold, etc. Operations of programmable analog discrimination system 106 will be discussed in more detail in connection with FIG. 2.

Programmable analog discrimination system 106 may provide output to one or more further systems. Programmable analog discrimination system 106 may provide output to component wake system 114. Component wake system 114 may be configured to determine whether output from programmable analog discrimination system 106 merits further action. Component wake system 114 may determine whether output from programmable analog discrimination system 106 merits waking one or more components, such as a processor, a CPU, an analog-to-digital converter (ADC), or the like. Component wake system 114 may initiate waking a processor. Component wake system 114 may be or comprise wake-up circuitry, a wake-up circuit, a wake-up block, or the like. Component wake system 114 may send a wake-up signal to a processor. The wake-up signal may facilitate the performance of one or more operations, such as waking a processor, providing signals to one or more components, etc. Component wake system 114 may initiate a series of operations, including waking a processor, providing signals to one or more components, etc.

Component wake system 114 may receive a number of inputs from programmable analog discrimination system 106. In some embodiments, component wake system 114 may receive input data generated as output by the components of programmable analog discrimination system 106 configured to report on characteristics of the audio signal. Component wake system 114 may receive input data generated by first condition circuitry 110, second condition circuitry 112, etc. Component wake system 114 may include a look-up table. In some embodiments, the output of subsystems of programmable analog discrimination system 106 may be binary, e.g., it may include information based on whether an incoming audio signal satisfied a threshold condition or not. Component wake system 114 may include a look-up table of a size determined by the number of conditions programmable analog discrimination system 106 is configured to analyze. For example, programmable analog discrimination system 106 may be configured to determine if the volume and frequency of an audio signal satisfy set conditions. Component wake system 114 may include a 2-by-2 look-up table to determine whether to initiate the waking of components based on an output of the programmable analog discrimination system.

Component wake system 114 may be configured to determine whether to facilitate wake-up operations of one or more components based on additional data. Component wake system 114 may make a determination on whether to perform one or more operations based on a pattern of inputs, a timing of inputs, a statistical metric associated with inputs, or the like. For example, component wake system 114 may facilitate the waking of one or more components based on receiving a number of indications that one or more characteristics of an audio signal satisfy threshold conditions, based on a threshold portion of incoming signals indicating the audio signal satisfies threshold conditions, based on a number of indications received in a set time, etc. Component wake system 114 may be configured to facilitate wake operations Component wake system 114 may be programmable. Component wake system 114 may include one or more wake-up tables. Entries of the one or more wake-up tables may be programmable. Entries of the one or more wake-up tables may be changed responsive to the environment of use of device 100. Component wake system 114 may include components such as comparators, timers, counters, etc., for determining whether signals received from programmable analog discrimination system 106 satisfy one or more conditions for facilitating wake-up operations. Operations of these components may be programmable. Programmable components may include features that can be updated. Programmable component thresholds may be adjustable, comparator reference values may be adjustable, selection of which logical pathways to utilize may be adjustable, etc.

Programmable analog discrimination system 106 may provide output to feedback system 116. Feedback system 116 may receive from programmable analog discrimination system 106 the same signals provided to component wake system 114, a subset of these signals, overlapping signals, etc. Feedback system 116 may, in some embodiments, receive signals from component wake system 114. Feedback system 116 may receive an indication of whether or not component wake system 114 has been determined to initiate processor wake-up based on signals received from programmable analog discrimination system 106. Feedback system 116 may be an analog system. Feedback system 116 may be a low-power system. Operation of feedback system 116 may be performed without input of a CPU, without conversion of an analog signal to a digital signal, or the like. Feedback system 116 may be or include a feedback circuit, feedback circuitry, a feedback block, a feedback circuit block, or the like.

Feedback system 116 may facilitate updating of parameters of programmable analog discrimination system 106 and/or component wake system 114. Feedback system 116 may cause changes to be made to reference voltages, counter values, comparator reference values, etc. Feedback system 116 may update the parameters of programmable analog discrimination system 106 and/or component wake system 114 to improve the operations of those systems. Feedback system 116 may update parameters of other systems based on the ambient environment of device 100. Feedback system 116 may update parameters of other systems based on acoustic signals received by microphone 102. Feedback system 116 may update parameters of other systems to increase a likelihood of waking a processor when acoustic signal 104 includes one or more target triggers, such as a wake word. Feedback system 116 may update parameters of other systems to decrease a likelihood of waking a processor when acoustic signal 104 does not include a target trigger. Feedback system 116 may be a low-power analog system.

Device 100 may be adjusted responsive to an intended use of device 100. Device 100 may be to perform an action responsive to an acoustic trigger. Device 100 may be to perform speech recognition operations based on a wake word. Device 100 may be a safety device, configured to respond to an acoustic trigger, such as the sound of breaking glass. Device 100 may be intended for use in a particular setting, such as an IoT device for a residence, a monitoring device for a construction, manufacturing, or research application, etc. Operations of device 100 may be tailored for the use of device 100, including acoustic trigger, environment, etc.

Programmable analog discrimination system 106 may be programmed to target an intended operation of device 100. Parameters of the system may be selected and/or adjusted for a target trigger, a target use environment, etc. Programmable analog discrimination system 106 may be programmed to verify a first condition of an audio signal based on a characteristic of the signal. For example, programmable analog discrimination system 106 may determine that a frequency of an audio signal is within a target range, satisfies a target condition, or the like. Programmable analog discrimination system 106 associated with an operation targeting a wake word may verify whether an audio signal is within a frequency range typical of human speech, for example, whether the audio signal contains components between 300 Hz and 3 kHz. A second condition may be adjusted to target determining whether an acoustic signal falls within a volume range typical for one or more triggers of device 100. Multiple sets of condition circuitry may be programmed for an intended trigger within an acoustic signal. Programmable analog discrimination system 106 may further be programmed for an intended environment of device 100. Programmable analog discrimination system 106 may be tailored to avoid falsely characterizing acoustic signals as potentially containing one or more triggers. For example, a device intended to be used in a noisy environment may impose more stringent conditions on one or more characteristics of a signal to affect the signals passed by programmable analog discrimination system 106 to component wake system 114. A device intended to be used in some environments may be programmed to utilize a subset of condition circuitry to check whether an incoming signal has characteristics satisfying a subset of conditions.

Feedback system 116 may be used to adjust operation of device 100 responsive to an environment of device 100. Feedback system 116 may be configured to adjust operation of device 100 while device 100 is in use. Feedback system 116 may cause adjustments to various parameters of programmable analog discrimination system 106 and component wake system 114 without waking up a processor. Feedback system 116 may be a low-power analog system. Feedback system 116 may adjust values stored to registers, cause adjustments to voltages supplied to components, adjust which components are operational, or make other changes to operations of programmable analog discrimination system 106 and/or component wake system 114.

Feedback system 116 may utilize inputs from programmable analog discrimination system 106 and/or component wake system 114 in determining whether to facilitate making adjustments to systems of device 100. Feedback system 116 may be configured to make adjustments to systems of device 100 based on signals received from the systems of device 100. Feedback system 116 may cause adjustment of operations of systems of device 100 to improve the sensitivity of trigger detection, selectivity of trigger detection, or the like. Feedback system 116 may be configured to facilitate adjustment of operations of device 100 based on discrepancies between signals associated with multiple characteristics of acoustic signals.

Feedback system 116 may be configured to adjust a first threshold condition associated with a first acoustic characteristic responsive to receiving one or more signals indicating that the first characteristic satisfied a condition, while a second characteristic did not satisfy a target condition. For example, feedback system 116 may be configured to adjust a first threshold condition responsive to receiving signals indicating that an acoustic signal is within a target frequency range, but outside a target volume range. Acoustic activity that satisfies a subset of target conditions may not include a target trigger, such as a wake word. Acoustic activity that satisfies a subset of target conditions may cause feedback system 116 to adjust one or more settings or parameters of device 100. Feedback system 116 may adjust programmable analog discrimination system 106 based on such input. Feedback system 116 may adjust the first condition to decrease a likelihood of a false positive determination of a trigger in an acoustic signal. Feedback system 116 may facilitate adjustments to systems of device 100 based on incoming signals, a number of incoming signals sharing one or more characteristics, a number of incoming signals sharing one or more characteristics received consecutively, a portion of incoming signals sharing one or more characteristics, a number of signals within a time period sharing one or more characteristics, etc.

Feedback system 116 may be configured to adjust the operation of component wake system 114, responsive to receiving one or more signals from component wake system 114. Component wake system 114 may provide a signal to feedback system 116 indicating whether wake-up operations for one or more components were initiated by component wake system 114. Feedback system 116 may adjust values of a look-up table of component wake system 114. Feedback system 116 may adjust counter values, comparator values, reference values, time duration values, or the like, associated with the decision-making of component wake system 114.

Component wake system 114 may provide a signal facilitating wake-up of one or more components responsive to receiving one or more signals from a programmable analog discrimination system 106. Component wake system 114 may provide a signal to voice activity detection system 118. A voice activity detection system may be configured to convert the analog audio signal to a digital signal. A voice activity detection system may include processing components, such as amplifiers, filters, etc. A voice activity detection system may be configured to store a digital audio signal in memory. A voice activity detection system may be configured to store a digital audio signal in memory for processing by a processor. Voice activity detection system and/or component wake system 114 may provide a signal to wake a processor, such as a CPU, for processing stored digital data.

Figure 2:
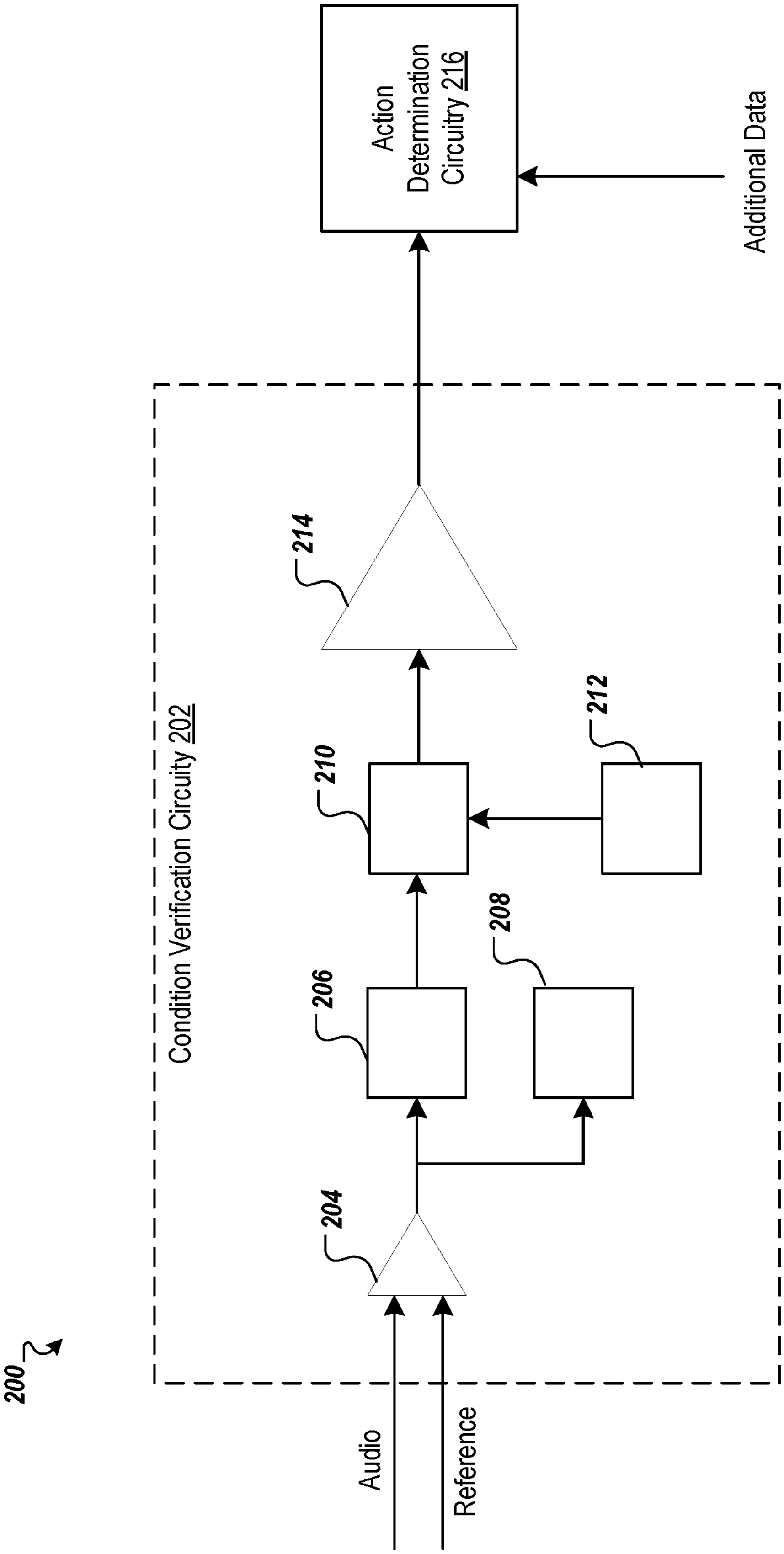
FIG. 2 is a block diagram of an example low-power programmable analog subsystem for acoustic activity detection, according to some embodiments.

FIG. 2 is a block diagram of an example low-power programmable analog subsystem 200 for acoustic activity detection, according to some embodiments. Subsystem 200 includes condition verification circuitry 202. A programmable analog subsystem similar to programmable analog subsystem 200 may include more sets of condition verification circuitry. A programmable analog subsystem may include more sets (than shown in FIG. 2) of circuitry configured to check whether a characteristic of an acoustic signal satisfies one or more threshold conditions. Condition verification circuitry 202 may be configured to compare one or more signals to one or more references. Condition verification circuitry 202 may be a comparison circuit, e.g., a circuit for comparing characteristics of a signal to a reference to verify whether one or more conditions are satisfied. Each set of condition verification circuitry may be configured to determine if an incoming audio signal satisfies a target condition. For example, first set of condition verification circuitry may determine whether an audio signal is within a target volume range, and a second condition verification circuitry may determine whether an audio signal is within a target frequency range. A low-power programmable analog subsystem for acoustic activity detection may include more or fewer sets of condition verification circuitry. In some embodiments, multiple sets of condition verification circuitry may be targeted at different characteristics of an acoustic signal, such as volume and frequency. In some embodiments, multiple sets of condition verification circuitry may be targeted at different conditions of an acoustic signal, and/or a set of condition verification circuitry may include additional components for determining whether a characteristic of the audio signal satisfies a plurality of conditions.

Condition verification circuitry 202 includes comparator 204. Comparator 204 may receive a reference signal and an audio signal. Comparator 204 may receive an audio signal from an analog microphone. Comparator 204 may be configured to generate one output if the audio signal satisfies a condition defined by the reference signal. Comparator 204 may be configured to generate a different output signal if the input audio signal does not satisfy the condition defined by the reference signal. As an example, condition verification circuitry 202 may be configured to determine whether the volume of an incoming signal meets or exceeds a target volume condition. A reference voltage may be applied to comparator 204 corresponding to the target volume. The comparator may generate a signal indicating whether the audio signal meets the threshold volume condition. The reference condition may be adjustable. Condition verification circuitry 202 may be programmable. The reference condition may be adjusted by a processor, such as a CPU. The reference condition may be adjustable by a feedback system, such as feedback system 116 of FIG. 1.

An output signal of comparator 204 may be provided to asynchronous circuitry 208. Asynchronous circuitry 208 may be configured to enact one or more operations based on an incoming signal. Asynchronous circuitry 208 may be configured to generate a wake signal for components of a device. Asynchronous circuitry 208 may be configured to generate a wake signal for a component of condition verification circuitry 202, components of one or more other sets of condition verification circuitry, or other components of the device. In some embodiments, an audio signal that exceeds a target voltage may trigger operation of one or more components. In some embodiments, an audio signal indicative of an acoustic signal that satisfies a volume condition may trigger operations of asynchronous circuitry 208.

Condition verification circuitry 202 may include synchronizer 206 for generating a consistent timing window for further operations. Operations of additional sets of condition verification circuitry may also be made to be synchronous with condition verification circuitry 202. Operations of synchronizer 206 may be adjustable. Adjustments of synchronizer 206 may include a signal level at which to synchronize timing, synchronizing timing on a rising or falling edge of a signal, etc. Synchronizer 206 may be adjusted by a feedback system.

A synchronized signal may be provided to a counter 210. Counter 210 may determine whether a signal from the comparator is provided a target number of times in a target time period. Counter 210 may be communicatively coupled to timer 212. Timer 212 may be used in defining a time period over which the counter 210 is to operate. Counter 210 may operate to count a number of cycles (defined by the synchronizer) that the comparator 204 produces a target signal. Counter 210 may operate in sequential or separate time windows. Counter 210 may operate in a series of overlapping time windows. In some embodiments, one timer may contribute to multiple counters and/or multiple sets of condition verification circuitry. In some embodiments, a counter and/or set of condition verification circuitry may have a dedicated timer. In some embodiments, signals from timers may be passed through multiplexers to allow variations of timing output. A selection of a time signal supplied to a counter may be programmable. A selection of a time signal supplied to a counter may be adjusted by a processor. A selection of a time signal supplied to a counter may be adjusted by a feedback system.

Output from counter 210 may be provided to comparator block 214. Comparator block 214 may include one or more comparators. Comparator block 214 may include additional logic gates, e.g., an and gate for determining if conditions set by two comparator blocks are both satisfied. Comparator block 214 may include the capability to be operated in multiple configurations, including signal flow through different components. Configuration of operation of comparator block 214 may be programmable. Configuration of operation of comparator block 214 may be adjusted by a feedback system. Other comparators of an acoustic activity detection system (e.g., comparator 204) may also be comparator blocks, including multiple comparators, multiple configurations, etc. Other comparator blocks may also be programmable, adjusted by a processor, adjusted by a feedback system, etc.

Comparator block 214 may be configured to determine if the output of counter 210 satisfies one or more threshold conditions. Comparator block 214 may determine if a count exceeds a threshold count condition. Comparator block 214 may determine if a count is under a threshold count condition. Comparator block 214 may determine if a count is within a range defined by an upper threshold count and a lower threshold count. Alternate configurations of comparator block 214 may allow operation in a number of these modes. Threshold conditions may be adjusted, e.g., by writing a value to a register, supplying a reference voltage to a comparator, etc. Threshold conditions adjustment may be facilitated by a feedback system. Threshold condition adjustment may be facilitated by a processor.

Condition verification circuitry 202 may provide a signal to action determination circuitry 216. Action determination circuitry 216 may share one or more features with component wake system 114 of FIG. 1. Action determination circuitry 216 may receive additional input. Action determination circuitry 216 may receive signals from other sets of condition verification circuitry. Action determination circuitry 216 may make a determination whether or not to facilitate wake-up operations of a processor, such as a CPU. Action determination circuitry 216 may include multiple configurations, similar to comparator block 214. Action determination circuitry may receive input from a timer such as a timer 212. Action determination circuitry may include a counter coupled to a timer. A counter coupled to a timer may be used to determine if a threshold number of signals is received within a target time period. Action determination circuitry 216 may include one or more look-up tables. Action determination circuitry 216 may synthesize data received related to multiple conditions of an acoustic signal, multiple characteristics of an acoustic signal, etc. Action determination circuitry 216 may provide a signal to components to wake up a processor. Action determination circuitry 216 may provide data to a feedback system.

Figure 3A:
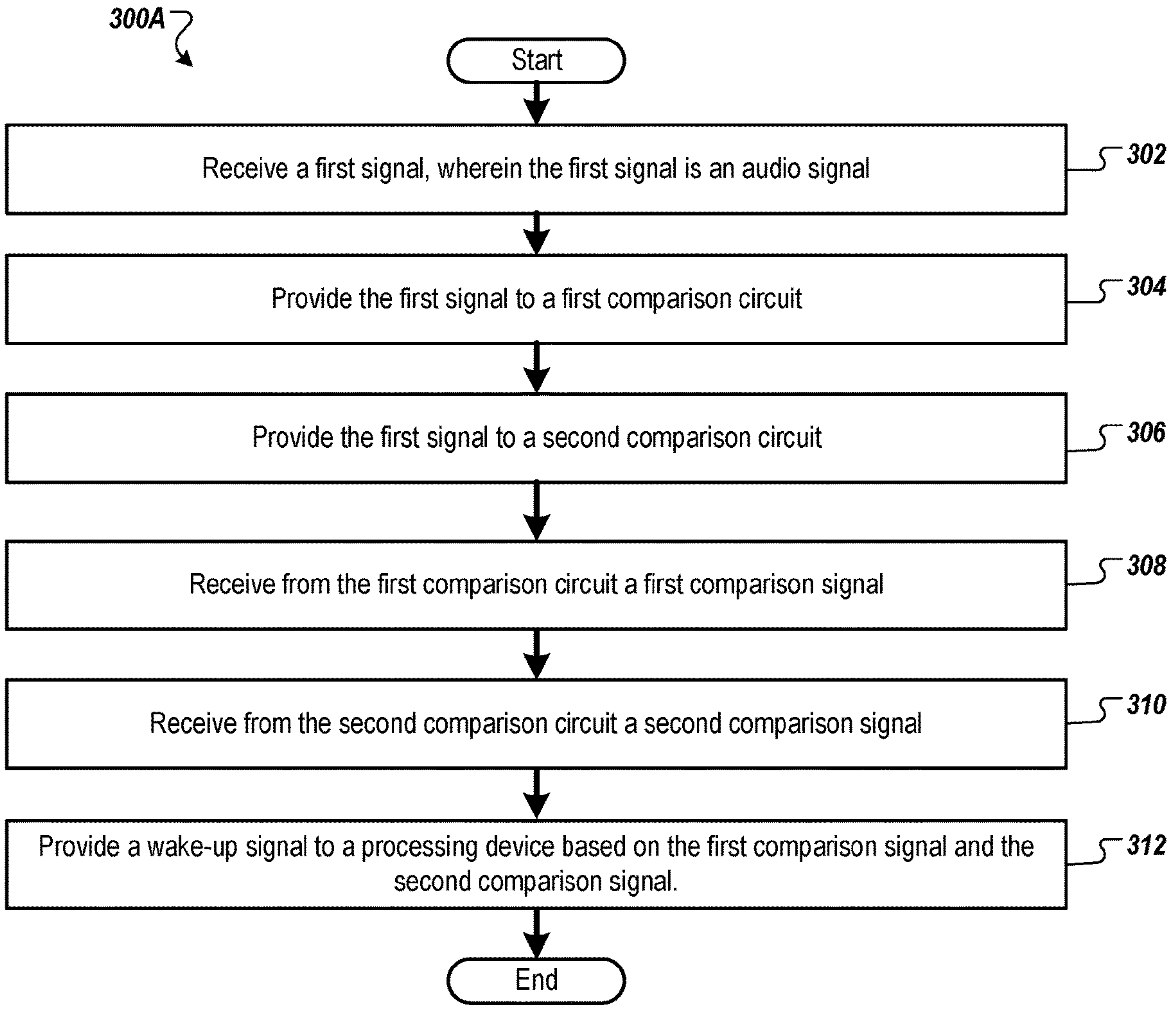
FIG. 3A is a flow diagram of a method for performing acoustic activity detection, according to some embodiments.

FIG. 3A is a flow diagram of a method 300A for performing acoustic activity detection, according to some embodiments. Method 300A may be performed by a low-power programmable analog subsystem. Method 300A may be performed by two comparison circuits of a programmable analog subsystem. Method 300A may be performed to facilitate determining the presence of a trigger in an acoustic signal.

At block 302, processing logic receives a first signal. The first signal is indicative of an audio signal. The first signal may be an analog signal. The first signal may be generated by a microphone, responsive to receiving an acoustic signal. The acoustic signal may contain a trigger, such as a wake word, a sound indicative of a corrective action to be taken, an acoustic alert, or the like.

At block 304, the first signal is provided to a first comparison circuit. At block 306, the first signal is provided to a second comparison circuit. The first and second comparison circuits may include a number of components. The comparison circuits may be configured to compare a characteristic of the audio signal to a reference, standard, threshold condition, or the like. The first and second comparison circuits may be configured to determine whether different characteristics of the acoustic signal satisfy a condition. The first and second comparison circuits may be configured to determine whether a characteristic of the acoustic signal satisfies different conditions. The comparison circuits may be programmable. The comparison circuits may include adjustable parameters such as comparator reference voltages. Adjustable parameters may be adjusted by a processor, a feedback system, or the like.

In some embodiments, one (or more) comparison circuits may be configured to determine whether the volume of an acoustic signal satisfies a threshold condition. Determining whether the acoustic signal satisfies the threshold condition may include determining whether a voltage of the audio signal meets, meets or exceeds, exceeds, or the like, a threshold voltage. The threshold may be a max voltage, an average voltage (e.g., a root mean square), or the like.

In some embodiments, one or more comparison circuits may be configured to determine whether a frequency of an acoustic signal satisfies a threshold condition. Determining whether the acoustic signal satisfies the threshold frequency condition may include counting a number of zero-crossings of an audio signal. Determining whether the acoustic signal satisfies the threshold frequency condition may include counting the number of times a voltage corresponding to the audio signal passes through some central value. The central value may be defined, for example, by the microphone. The central value may be provided as a reference voltage to a comparator. The central value may be adjustable.

In some embodiments, a comparison circuit includes one or more counters. A counter may be utilized to determine the number of zero-crossings of an audio signal, for determining the frequency of an acoustic signal. A counter may be utilized to determine the number of samples received that satisfy a threshold condition, such as a volume condition. A counter may be coupled to a timer. The timer may define a time window over which the counter operates. A frequency of a signal may be determined by counting the number of zero-crossings of a signal that occur in a given time interval. Operations of the timer may be adjustable. A duration of a time window imposed by the timer on a counter may be adjustable. Operations of the timer may be adjusted by a processor, such as a CPU. Operations of the timer may be adjusted by a feedback system, such as a feedback system of a low-power programmable analog subsystem.

Multiple parameters of the comparison circuits, the acoustic activity detection system, the device hosting these systems, or the like, may be adjustable. These systems and devices may be programmable, by a processor, by an analog feedback system, or the like. A comparison circuit may include one or more comparators. The comparators may be provided with reference voltages that are programmable. The comparison circuit may have components to support multiple configurations. The comparison circuit may include components for verifying conditions of multiple characteristics of a signal, may include components for verifying multiple conditions of a characteristic of a signal, etc. The selection of which components are utilized may be programmable. A comparison circuit may include one or more counters and/or timers. Counters and timers may be adjustable and/or programmable. Counters may operate in a subsequent window mode or overlapping window mode, timers may provide data facilitating adjustable time windows for counters, etc. Which comparison circuits are utilized may be programmable. For example, for some applications, a subset of available comparison circuits may be utilized.

An analog feedback system may be utilized to update adjustable parameters of the acoustic activity detection system, the low-power programmable analog subsystem, or the like. The feedback system may update adjustable parameters of the acoustic activity detection system without the involvement of a processor, such as a CPU, while the processor is in a sleep or deep sleep state, or the like. The feedback system may be configured to make adjustments (e.g., send a signal to facilitate an adjustment) to parameters of the acoustic activity detection system based on signals received from one or more comparison circuits. The feedback system may make adjustments to other portions of an acoustic activity detection system, such as components that determine whether to send a wake signal to a processor or one or more other components.

At block 308, processing logic receives (e.g., obtains) a first comparison signal from the first comparison circuit. At block 310, processing logic receives a second comparison signal from the second comparison circuit. The first and/or second comparison signals may indicate that a condition was satisfied. The first and/or second comparison signals may indicate that a number of conditions were satisfied, such as a frequency of an audio signal being between a lower threshold and an upper threshold. The first and second comparison signals may be provided to a feedback system. The first and second comparison signals may be provided to a system for determining whether to perform further actions based on the audio signal. The first and second comparison signals may be used to determine whether the audio signal is sufficiently likely to include a target trigger to perform additional actions.

At block 312, a wake-up signal is provided to a processing device based on the first comparison signal and the second comparison signal. Further operations may be facilitated by the wake-up signal, simultaneously to providing the wake-up signal, in connection with the wake-up signal, or the like. Further operations may include providing the first signal to an analog-to-digital converter. Further operations may include converting the first signal from an analog format to a digital format. Further operations may include storing the first signal in the digital format in memory.

The processing device may receive the first signal in the digital format. The processing device may perform an analysis of the signal, such as determining whether a trigger is included in the signal. The trigger may include a wake word. The processor may perform wake word detection. The trigger may include data indicative of another trigger, such as a sound alert, glass breaking, etc. The processing device may reprogram the acoustic activity detection system.

Figure 3B:
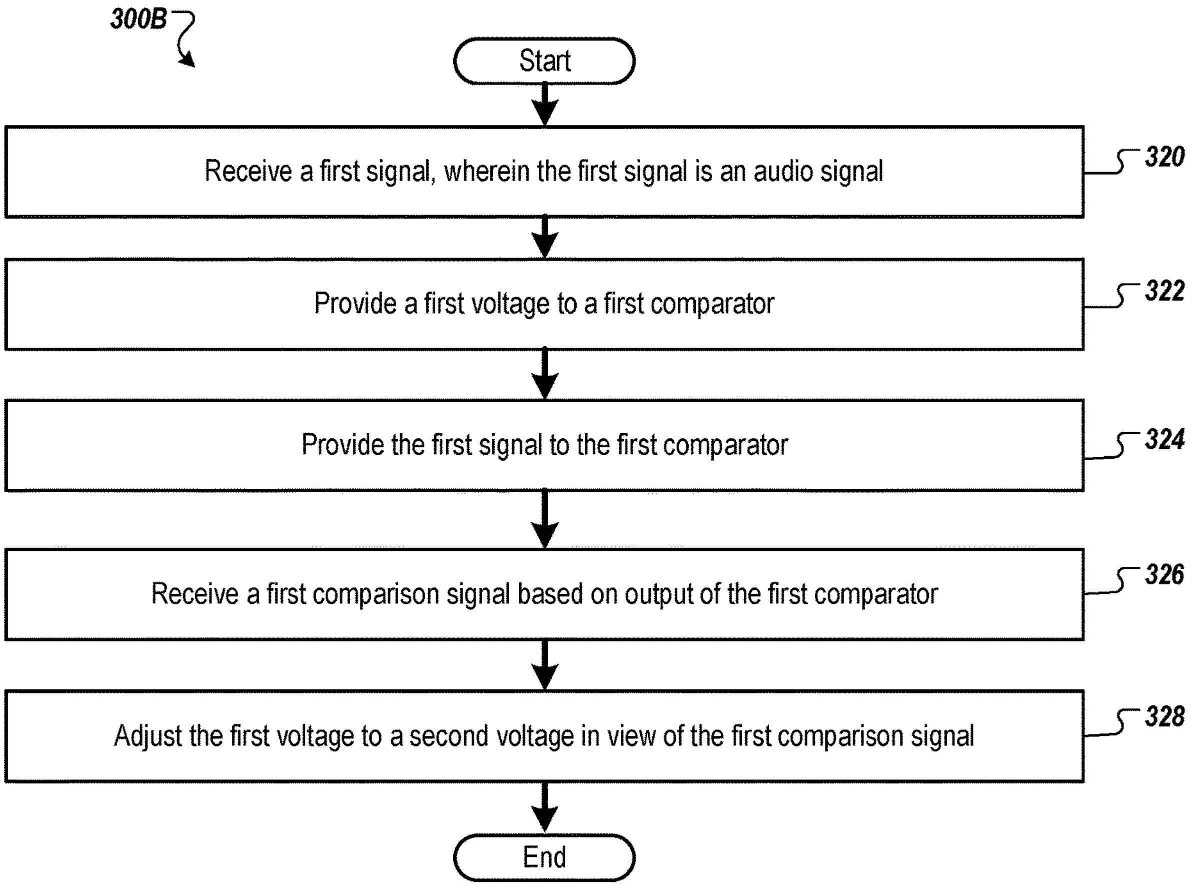
FIG. 3B is a flow diagram of a method for updating parameters of a system, such as an acoustic activity detection system, according to some embodiments.

FIG. 3B is a flow diagram of a method 300B for updating parameters of a system, such as an acoustic activity detection system, according to some embodiments. At block 320, processing logic receives a first signal. The first signal is an audio signal. The first signal may be based on an acoustic signal. The first signal may be an audio signal based on an acoustic signal received by a microphone. The first signal may be an analog signal. The first signal may include a trigger. The first signal may correspond to an acoustic signal, including a wake word or another acoustic trigger. The processing logic may comprise an acoustic activity detection system.

At block 322, a first voltage is provided to a first comparator. The first voltage may be a reference voltage. The first voltage may be adjustable. The first voltage may define a threshold condition. The first comparator may be configured to report whether the first signal satisfies the threshold condition. The first voltage may be correlated to a physical property of an acoustic signal associated with the first signal, such as a target volume, an acoustic wave zero-crossing, or the like.

At block 324, the first signal is provided to the first comparator. The comparator may be configured to compare a value of the first signal to a reference value. The comparator may be configured to determine whether the first signal satisfies a threshold condition. In some embodiments, the first signal and a second reference voltage may be provided to a second comparator. The first signal may be provided to additional comparators, additional components such as an analog-to-digital converter, etc.

At block 326, processing logic receives a first comparison signal based on an output of the first comparator. The output may be associated with a physical characteristic of an acoustic signal associated with the first signal. The first comparison signal may be indicative of whether the characteristic satisfied one or more conditions. For example, the first comparison signal may be indicative of whether an acoustic signal associated with the first signal belongs to a frequency range associated with speech.

At block 328, processing logic adjusts the first voltage to a second voltage in view of the first comparison signal. Adjusting the second voltage may be performed by a feedback system. Processing logic may adjust the second voltage to change a threshold voltage condition. Processing logic may adjust the second voltage to update the operation of the acoustic activity detection system. Processing logic may adjust the second voltage to improve the operation of the acoustic activity detection system. Processing logic may adjust the second voltage to improve sensitivity to an acoustic trigger, reduce sensitivity to false triggers, etc.

In some embodiments, multiple comparison signals may be received. The comparison signals may be based on output from a single comparator, multiple comparators in parallel and/or serial configurations, etc. The comparison signals may be based on output by timers and/or counters. The comparison signals may be generated by a comparison circuit, such as condition verification circuitry 202 of FIG. 2. A wake-up signal may be provided to a processing device or one or more other components based on a signal from the first comparator, a comparison circuitry, or the like. A wake-up signal may be generated based on a signal received from the first comparator after a reference voltage provided to the first comparator is adjusted by a feedback system.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware, or code set forth above may be implemented via instructions or code stored on a machine-accessible, machine-readable, computer-accessible, or computer-readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method, comprising:

receiving a first signal, wherein the first signal is an audio signal;

providing the first signal to a first comparison circuit;

providing the first signal to a second comparison circuit;

receiving from the first comparison circuit a first comparison signal;

receiving from the second comparison circuit a second comparison signal; and providing a wake-up signal to a processing device based on the first comparison signal and the second comparison signal.

2. The method of claim 1, further comprising:

determining, by the first comparison circuit, whether the first signal satisfies a first threshold voltage condition;

determining, by the first comparison circuit, a number of instances that the first signal satisfies the first threshold voltage condition in a first period of time; and determining, by the first comparison circuit, whether the number of instances that the first signal satisfies the first threshold voltage condition in a first period of time satisfies a first frequency condition, wherein the first comparison signal is based on whether the number of instances that the first signal satisfies the first threshold voltage condition in the first period of time satisfies the first frequency condition.

3. The method of claim 2, further comprising:

receiving a third comparison signal from the first comparison circuit; and adjusting a value of a second threshold voltage condition to the first threshold voltage condition responsive to receiving the third comparison signal.

4. The method of claim 2, further comprising:

receiving a third comparison signal from the first comparison circuit; and adjusting a duration associated with determining the number of instances that the first signal satisfies the first threshold voltage condition from a first value to a second value, wherein the second value is associated with the first period of time.

5. The method of claim 2, further comprising:

receiving a third comparison signal from the first comparison circuit; and adjusting a value of a frequency condition associated with the number of instances that the first signal satisfies the first threshold voltage condition in a first period of time from a first value to a second value, wherein the second value is associated with the first frequency condition.

6. The method of claim 2, wherein determining whether the first signal satisfies a first threshold voltage condition comprises determining whether a voltage of the first signal exceeds a target voltage, and wherein the target voltage is correlated to a target volume of the audio signal.

7. The method of claim 2, wherein determining whether the first signal satisfies a first threshold voltage condition comprises determining whether a voltage of the first signal is less than a target voltage, and wherein the number of instances that the first signal satisfies the first threshold voltage condition in a first period of time is correlated to a frequency of the audio signal.

8. The method of claim 1, wherein the wake-up signal facilitates performance of operations comprising:

converting, by an analog-to-digital converter, the first signal to a digital format; and storing the first signal in the digital format to memory.

9. The method of claim 8, further comprising:

obtaining, by the processing device, the first signal in the digital format; and performing wake word detection analysis on the first signal in the digital format.

10. A method, comprising:

receiving a first signal, wherein the first signal is an audio signal;

providing a first voltage to a first comparator;

providing the first signal to the first comparator;

receiving a first comparison signal based on output of the first comparator;

adjusting the first voltage to a second voltage in view of the first comparison signal;

receiving a second signal, wherein the second signal is indicative of an audio signal;

providing the second voltage to the first comparator;

providing the second signal to the first comparator;

receiving a second comparison signal based on output of the first comparator, wherein the second comparison signal is generated responsive to the second voltage and the second signal; and providing a wake-up signal to a processing device responsive to the second comparison signal.

11. The method of claim 10, wherein the first comparison signal is correlated to a volume of an acoustic signal associated with the first signal.

12. The method of claim 10, further comprising:

determining a frequency that the first signal satisfies a condition associated with the second voltage, wherein the frequency that the first signal satisfies the conditions associated with the second voltage is correlated to a frequency of an acoustic signal associated with the first signal.

13. A method, comprising:

receiving a first signal, wherein the first signal is an audio signal;

providing a first voltage to a first comparator;

providing the first signal to the first comparator;

receiving a first comparison signal based on output of the first comparator;

adjusting the first voltage to a second voltage in view of the first comparison signal providing the first signal to a second comparator;

providing a third voltage to the second comparator;

receiving a second comparison signal based on output of the second comparator; and adjusting the third voltage to a fourth voltage in view of the second comparison signal providing a second signal to the first comparator, wherein the second signal is indicative of an audio signal;

providing the second signal to the second comparator;

receiving a second comparison signal from the first comparator, wherein the second comparison signal is based on the second signal and the second voltage;

receiving a third comparison signal from the second comparator, wherein the third comparison signal is based on the second signal and the fourth voltage; and providing a wake-up signal to a processing device responsive to the second comparison signal and third comparison signal.

14. The method of claim 13, wherein the first comparison signal is correlated to a volume of an acoustic signal associated with the first signal.

15. The method of claim 13, further comprising:

determining a frequency that the first signal satisfies a condition associated with the second voltage, wherein the frequency that the first signal satisfies the conditions associated with the second voltage is correlated to a frequency of an acoustic signal associated with the first signal.

* * * * *